United States Patent [19]

Stephenson et al.

[11] 4,332,401
[45] Jun. 1, 1982

[54] INSULATED CASING ASSEMBLY

[75] Inventors: Edgar O. Stephenson, W. Tacoma; John M. Kohl, Tacoma; Charles R. Cunningham, S. Seattle, all of Wash.

[73] Assignee: General Electric Company, Schenectady, N.Y.

[21] Appl. No.: 105,667

[22] Filed: Dec. 20, 1979

[51] Int. Cl.³ .............................................. F16L 59/14
[52] U.S. Cl. ..................................... 285/47; 138/149; 285/53; 285/355
[58] Field of Search ..................... 285/47, DIG. 5, 53, 285/355; 138/149

[56] References Cited

U.S. PATENT DOCUMENTS

| | | |
|---|---|---|
| 2,419,278 | 4/1947 | Motsenbocker, Jr. ............ 285/47 X |
| 2,980,451 | 4/1961 | Taylor et al. ..................... 285/333 X |
| 3,068,026 | 12/1962 | McKamey ............................ 285/47 |
| 3,146,005 | 8/1964 | Peyton ................................. 285/47 |
| 3,275,345 | 9/1966 | Waldron et al. ...................... 285/47 |
| 3,280,849 | 10/1966 | Rendos et al. ..................... 285/47 X |
| 3,369,826 | 2/1968 | Boosey et al. ........................ 285/47 |
| 3,574,357 | 4/1971 | Alexandru et al. .................... 285/47 |
| 3,680,631 | 8/1972 | Allen et al. . |
| 3,850,714 | 11/1974 | Adorjan ............................ 285/47 X |
| 3,854,756 | 12/1974 | Couch ................................. 285/47 |
| 3,885,595 | 5/1975 | Gibson et al. .................... 285/47 X |
| 4,019,761 | 4/1977 | Heidemann ......................... 285/47 |
| 4,054,158 | 10/1977 | Hoeman et al. ................. 285/47 X |
| 4,130,301 | 12/1978 | Dunham et al. ...................... 285/47 |

FOREIGN PATENT DOCUMENTS 750758 1/1967 Canada ............................... 138/149

Primary Examiner—Thomas F. Callaghan
Attorney, Agent, or Firm—Robert C. Lampe, Jr.; H. H. Green, Jr.

[57] ABSTRACT

An insulated casing assembly for use in injecting steam into wells, comprising a plurality of interconnected casings, each casing having outer and inner tubular sections, an annular spacing between the two sections containing multilayered thermal insulation enveloped in a low conductivity gas, and tubular bellows connecting and allowing relative movement between the corresponding ends of the two inner sections. A leak-proof connection between adjacent casings includes a diffuser sleeve fitted tightly over the ends of adjacent inner tubular sections, a filler ring fitted on the diffuser sleeve and disposed between adjacent outer tubular sections, and a threaded coupling screwed onto threaded ends of outer tubular sections of adjacent casings.

19 Claims, 4 Drawing Figures

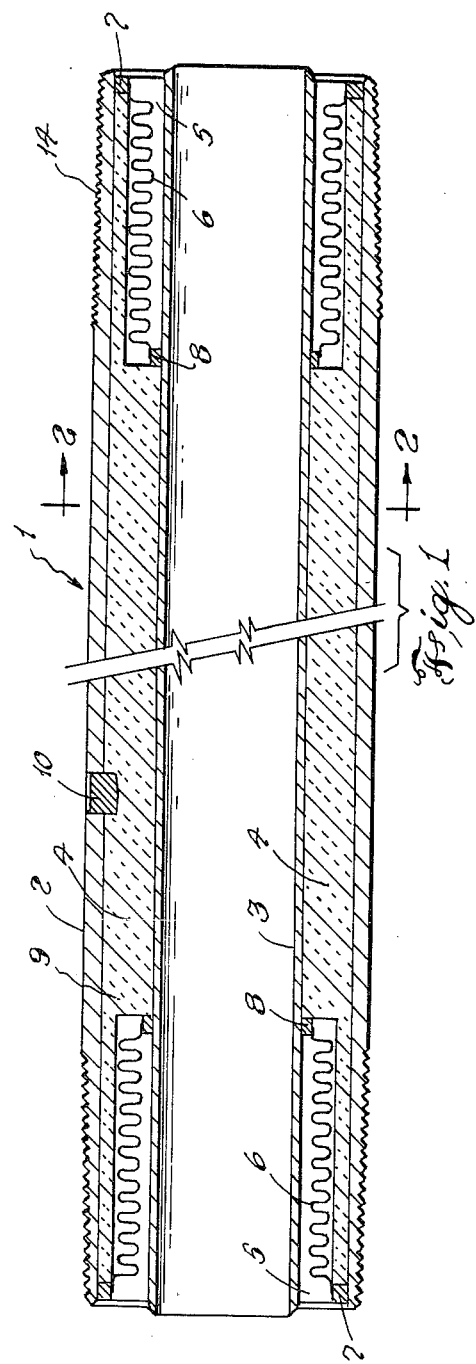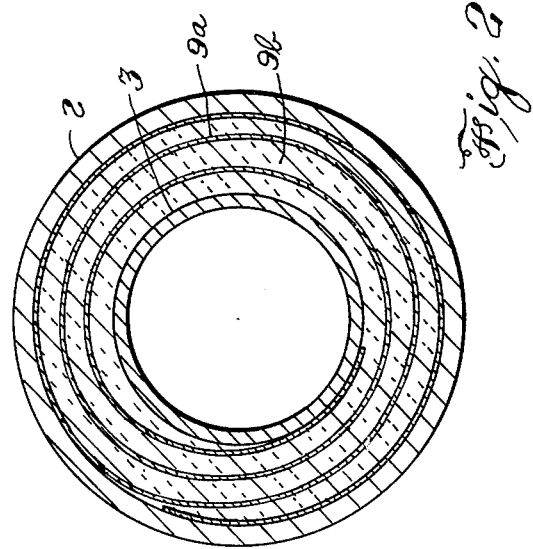

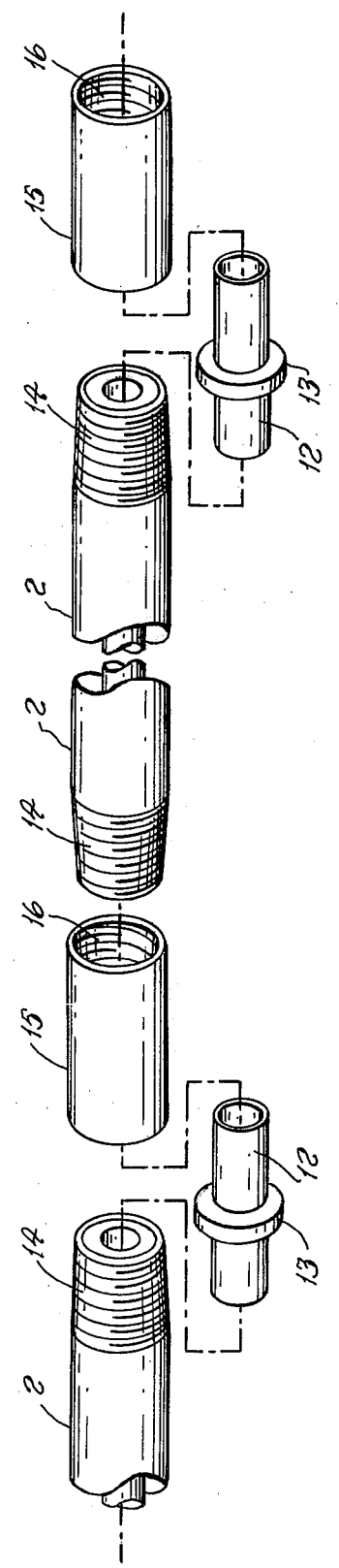

INSULATED CASING ASSEMBLY

BACKGROUND OF THE INVENTION

1. Field of the Invention

This invention relates to insulated casings for fluid transfer and particularly to a new and improved insulated casing assembly for oil well steam injection which greatly reduces heat transfer between the fluid and the casing components, and permits the outer sections of plural casings to be rigidly coupled together without fluid leakage while the inner sections of the casings are free to expand or contract lengthwise in response to the temperature changes of the fluid which they carry.

2. Description of the Prior Art

Casing assemblies utilized to transfer fluids downhole must be constructed so as to be structurally rigid and leak-proof while being capable of cyclic changes in dimension in response to temperature changes of the fluid flowing through them. This is particularly true when the casing assembly is used to inject very high temperature steam into an oil well. The purpose of steam injection is to lower the viscosity of heavy crude so that it can be pumped or forced to the surface and thus extend recovery. The casing assemblies which are used in such a manner, however, are subject to several potentially destructive forces. Very high static internal and external pressure forces are exerted on the casing walls and the couplings when the assemblies are inserted deep into the ground. Each casing is subjected to the axial force of the weight of the other casings suspended below it in the casing string. The corrosive effects, the erosive effects, and the pressure forces caused by the steam itself on the internal components of the casing as well as the differential thermal expansion of such components caused by the high temperature of the steam and contamination by downhole fluids can cause structural failure of the casing assembly. Insulated assemblies currently used for transporting fluids of less extreme temperatures cannot be readily adapted for oil well steam injection purposes because of the severe conditions encountered downhole in the well. Conventionally insulated flowtubes leave the insulation susceptible to contamination by downhole fluids causing loss of insulating properties and potential failure of the permanent well casing due to overstressing. Another alternate to this method encases the majority of the insulation in a sealed metal jacketing but leaves the joint area completely uninsulated to allow for joint makeup tooling. This uninsulated portion allows high heat transfer locally to the permanent well casing thus producing potential failure stresses in that casing. Previous systems have no provision for accommodating thermal expansion of the flowtube which may amount to more than 10 feet in moderate depth wells and present very difficult sealing problems for the bottom hole packer.

A primary object of the present invention is therefore to provide a new and improved insulated casing assembly for transferring fluids in which an inner fluid-carrying section of each casing is free to incrementally expand or contract in response to temperature changes of the fluid while the outer load bearing section of the casing remains essentially rigid.

Another object of the present invention is to provide an insulated casing assembly in which insulation separating the fluid-carrying portion of each casing from the rigid portions is isolated and thus protected from the fluid.

Another object of the present invention is to provide an insulated casing assembly in which couplings used to join adjacent casings are protected from the high temperature fluid and thus fluid leakage between adjacent casings is substantially avoided.

Another object of the present invention is to provide an insulated casing assembly which insulates along its entire length thus avoiding high heat losses at the coupling area.

Another object of the present invention is to provide an insulated casing with a substantially lower overall thermal conductivity than presently available.

Still another object of the present invention is to provide an insulated casing assembly capable of withstanding static and dynamic high pressure forces without casing assembly failure.

SUMMARY OF THE INVENTION

The present invention, in accordance with one embodiment thereof, comprises an insulated casing assembly including a plurality of insulated casings which, when coupled or strung together, permit fluids of high or low temperatures and pressures to flow therethrough with low heat loss and without leakage. Each casing comprises radially spaced outer and inner tubular sections defining an annular space therebetween. The annular space is filled with thermal insulating material, preferably a high efficiency multilayered insulation, and a filling point in the outer tubular section permits the annular space to be evacuated of air and back-filled with a low conductivity gas to envelop the multilayered insulation and thus improve the insulating characteristics of the casing. A fluid-tight tubular bellows at each end of the casing seals the outer and inner tubular sections and allows the inner tubular section to expand or contract lengthwise relative to the outer tubular section while also protecting the insulation within the annular space from the fluid. Each of the bellows is sealed to the inner tubular section at a region spaced inwardly from the respective end of the section. Thereby, when two casings are joined, a diffuser sleeve can be fitted over spaced opposing ends of adjacent inner tubular sections to inhibit fluid escape into the bellows cavity and to prevent steam impingment of the bellows assembly and coupling. Additionally, an insulated filler ring is fitted on the diffuser sleeve to inhibit heat transfer from the fluid through the gap between adjacent casings. A thread coupling is screwed onto the ends of adjacent casings to rigidly maintain them in a longitudinally coaxial relationship.

BRIEF DESCRIPTION OF THE DRAWING

FIG. 1 is a fragmentary cross-sectional view of an insulated casing according to the present invention.

FIG. 2 is a cross-sectional view of an insulated casing incorporating multilayered insulation within the annular space, taken along lines 2—2 of FIG. 1.

FIG. 4 is an exploded fragmentary perspective view showing components of the casing assembly of the present invention separated.

DESCRIPTION OF THE PREFERRED EMBODIMENT

Figure 3:
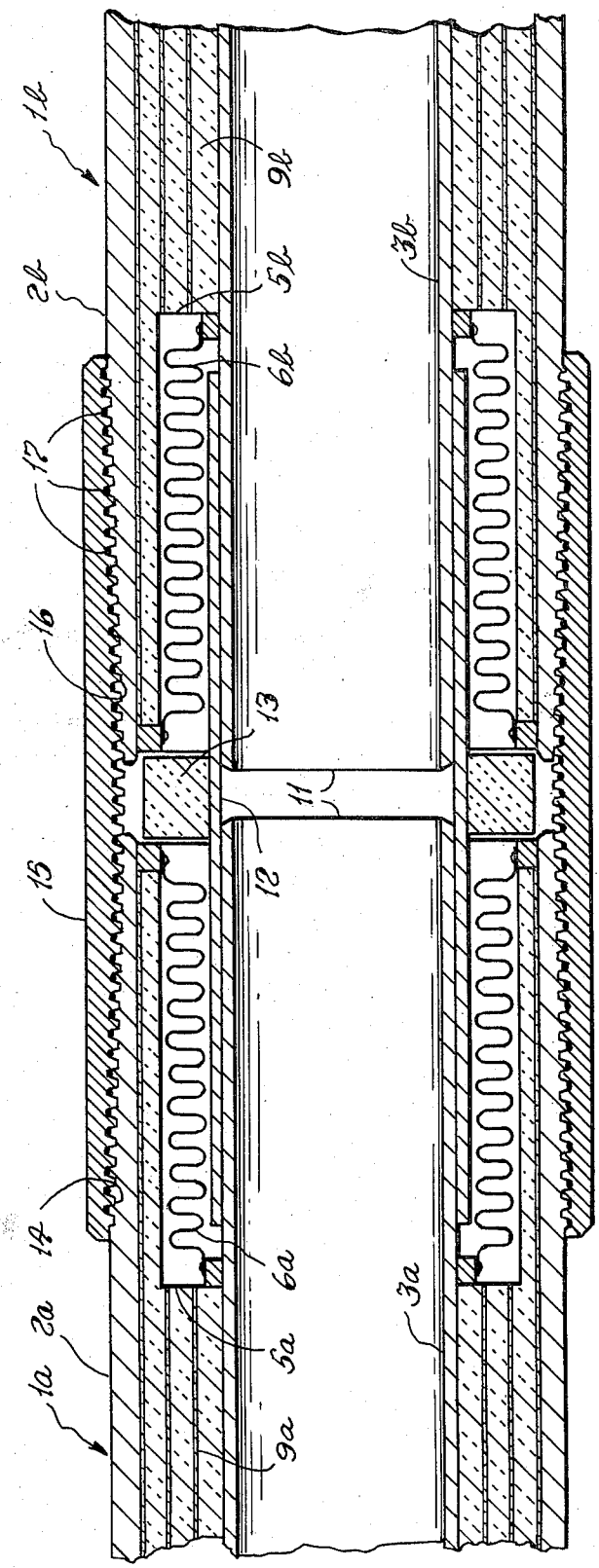
FIG. 3 is a fragmentary cross-sectional view of the insulated casing assembly including two casings and coupling means according to the present invention.

Referring now to FIG. 1, there is shown an insulated casing 1. The casing 1 can be joined to other insulated casings, in a manner to be described hereinafter, to establish a conduit for transporting fluids, particularly very high or low temperature fluids over long distances with low heat loss and without leakage.

The outer wall of the casing 1 is defined by an outer tubular section 2. The inner wall of the casing, which forms a flowtube through which fluids flow, is defined by an inner tubular section 3. The inner and outer tubular sections are concentric and the radial spacing of the inner and outer section walls are such as to provide an annular space 4 therebetween.

The specific material from which the tubular sections are made, as well as its grade and thickness, will vary with the conditions to which the casing is subjected. Several factors must be considered. The tubular sections should be constructed of a material which provides adequate structural support for the casing. When a primary use for the casing is to inject high pressure steam deep into the earth, the material must also be capable of withstanding the effects of excessive pressure, temperature, and corrosion. Further, if the tubular sections undergo welding during manufacturing, a material with a suitable weldability must be selected. Steel alloys of various types are examples of materials suitable for use in forming the tubular sections 2 and 3.

The region in the annular space 4 at each end of the casing 1 constitutes a bellows cavity 5. Within the cavity 5 is located a fluid-tight tubular bellows 6. The purposes of the bellows 6 are to seal the corresponding ends of the tubular sections while allowing thermal expansion and contraction of the inner tubular section 3 relative to the outer tubular section 2. The sealing prevents any fluid which is flowing through the inner section 3 from escaping into the annular space 4 and adversely affecting insulation material therein. To accomplish this, one end of the bellows 6 is sealingly connected to the inner surface of the outer tubular section 2 and the other end is similarly connected to the outer surface of the inner tubular section 3 at a point substantially spaced inwardly from the end of the section 3.

The bellows 6 can be made of any material which is sufficiently flexible such that it can be shaped into a corrugated form which permits the bellows to expand and contract with the tubular sections to which it is connected. Another consideration for the choice of bellows material is that when the casing is used to convey high or low temperature fluids, particularly steam under pressure, the bellows must be able to function properly despite the adverse effects of such temperature, pressure and load cycles and corrosion factors.

An example of a suitable bellows material when the casings are used for injecting steam into wells is an alloy of nickel and chromium available under the trademark Inconel-718 of Huntington Alloy Products Division International Nickel Company, Inc.

The bellows 6 are connected to the corresponding ends of the tubular sections 2 and 3 by means appropriate to the materials of which the bellows 6 and the tubular sections 2 and 3 are made. More specifically, when the bellows and tubular sections are made of Inconel and steel, respectively, connection may be made, for example, by welding the respective ends of the bellows 6 to the metal weld rings 7 and 8 formed of a metal weldable to the metals of which the bellows and casing sections are formed. The weld rings 7 and 8 are in turn welded to the appropriate surfaces of the tubular sections 2 and 3. Of course, connection can be accomplished in other ways, such as by welding the ends of the bellows 6 directly to the surfaces of the tubular sections 2 and 3. However, in some applications it is more advantageous to utilize weld rings than to weld the bellows directly to the tubular sections. The welding of the bellows to the weld rings can take place in a controlled operation, separate from the assembly of the remainder of the casing components. This avoids burning through of the bellows material which can otherwise occur due to the relative thinness of the bellows material. The weld rings are thus effective heat sinks during the welding step and the completed subassembly is then inserted into the bellows cavity 5 along with the bellows, and welded to the tubular sections with less chance of burn-through.

The remainder of the annular space 4 is filled with a thermal insulating material 9. The appropriate insulating material utilized is determined by the use, and particularly by the extremes of temperature, to which the casing assembly is to be subjected. For example, when the casing assembly is to be used to inject steam into a well, a high efficiency multilayered insulation is appropriate.

One type of multilayered insulation which is suitable is shown in FIG. 2 and comprises layers of reflective aluminum radiation shields 9a separated by a low conductivity, loose weave, random-oriented, long-fiber fiberglass spacer material 9b. However, as was indicated above, any other insulating material can be utilized which possesses the proper thermal insulating qualities required by the use to be made of the casing assembly. The insulation used can be manufactured in the shape of a tube and inserted into the annular space 4. Alternatively, it can be manufactured into a flat blanket and wrapped around the inner tubular section, overlapping itself sufficiently to negate gap heat loss.

As an additional insulation measure in the casing 1, a partial vacuum can be effected in the annular space 4 through a filling point 10 after the insulation is placed therein, and then the annular space is back-filled through the same filling point 10 with a low conductivity gas, selected from the group consisting of carbon dioxide, krypton, xenon, and hydrogen bromide and combinations thereof. After the back-filling is complete, the annular space 4 is hermetically sealed at the filling point 10. The gas envelopes the insulation within the annular space 4 and thereby improves its insulating efficiency.

FIG. 3 shows two insulated casings 1a and 1b connected together in such a manner that fluid flowing through the inner tubular section of one casing can continue to flow into the inner tubular section of the acjacent casing without leakage. When the two casings 1a and 1b are properly aligned end-to-end, a gap 11 exists between the ends of the two inner tubular sections 3a and 3b. The purpose of the gap 11 is to allow for expansion or contraction of the inner tubular sections along their lengths in response to the temperature of the fluids they carry. In order to confine the fluid to the inner tubular sections 3a and 3b and inhibit fluid escape through the gap 11, a diffuser sleeve 12 is fitted tightly around the outer walls of each inner tubular section. The ends of the diffuser sleeve 12 protrude into the bellows cavities 5a and 5b between the bellows 6a and 6b and the outer walls of the inner tubular sections 3a and 3b. The diffuser sleeve 12 is constructed of a material capable of withstanding the temperature of the fluid to which it is subjected, and preferably can be of the same material as the inner tubular sections 3a and 3b.

A filler ring 13 is fitted on the diffuser ring 12 and is disposed between the ends of the bellows cavities 5a and 5b. The filler ring 13 is made of an insulating material, such as, for example, layers of aluminum and woven glass. The purpose of the filler ring 13 is to provide a thermal barrier between the inner portion of the casing and the coupling means around the outside of the casing and also to insulate the bellows cavity 5. When the fluid flowing through the inner tubular sections is steam, any steam leaking from the inner tubular section and coming into contact with the filler ring 13 will cause the filler ring to expand and abut the ends of the bellows cavities 5a and 5b, thus preventing the steam from impinging on the coupling means.

Adjacent casings 1a and 1b are connected by any type of coupling means which is effective to maintain the outer tubular sections 2a and 2b in a fixed, longitudinally coaxial, end-to-end relationship. One arrangement effective for accomplishing this is shown in FIGS. 3 and 4. In this arrangement, the surface of the outer tubular section of each casing is threaded at each end, as at 14. A thread coupling 15, internally threaded at 16 to match the casing threads at 14, is screwed onto each end of the casings 1a and 1b. The thread coupling 15 can also have a fluorocarbon O-ring seal 17, such as one formed of Teflon material available from the DuPont de Nemours Company, added on its threads. The threads of the outer tubular section dig into the fluorocarbon seal as the thread coupling is screwed onto it and thus the fluorocarbon seal serves to improve the sealing characteristics of the coupling.

Two casings, each containing an outer tubular section 2, an inner tubular section 3, bellows 6, and insulating material 9 are joined to comprise a completed insulated casing assembly as follows. A thread coupling 15 is screwed onto the threads on the end of the outer tubular section 2 of a first casing. A diffuser sleeve 12, with the filler ring 13 around it, is slipped down around the inner tubular section of the first casing. The second casing is then aligned with the diffuser sleeve 12 and the thread coupling 15 is screwed tightly onto the outer tubular section of the second casing. As a result, the two casings are maintained in a fixed, longitudinally coaxial relationship, and each inner tubular section of the casing assembly is capable of communicating fluid to the adjacent inner tubular section while being free to expand and contract along its length. In this arrangement, the diffuser sleeve 12 confines the fluid to the inner tubular sections while the filler ring 13 provides a thermal barrier between the diffuser sleeve and the thread coupling 15. The bellows 6 provides a flexible connection between the inner and outer tubular sections and also prevents the fluid from entering the annular space 4, which contains multilayered insulation enveloped in a low conductivity gas effective for reducing heat transfer between inner and outer tubular sections.

It is to be understood that this invention is not limited to the particular embodiment disclosed, and it is intended to cover all modifications coming within the true spirit and scope of this invention as claimed.

What is claimed is:

1. An insulated casing assembly comprising;
   (a) a pair of coaxially arranged casings, each casing comprising radially spaced inner and outer tubular sections defining an annular space therebetween, and expandible sealing means extending from a point spaced inward from the end of each said inner tubular section in an axial direction to said outer tubular section thereby forming an axially extending cavity around each said inner tubular section;
   (b) a sleeve tightly fitting over the opposed ends of the inner tubular sections and extending into said axially extending cavities;
   (c) a filler ring fitted on said sleeve and disposed between the opposed ends of said casings; and
   (d) means for coupling said outer tubular sections.

2. The insulated casing assembly of claim 1, wherein each said casing further comprises thermal insulating material contained within said annular space.

3. The insulated casing assembly of claim 2, wherein said insulating material comprises multilayered insulation.

4. The insulated casing assembly of claim 3, wherein said multilayered insulation is enveloped in a low conductivity gas.

5. The insulated casing assembly of claim 4, wherein said low conductivity gas is selected from the group consisting of carbon dioxide, krypton, xenon, hydrogen bromide, and combinations thereof.

6. The insulated casing assembly of claim 5, wherein said insulating material comprises annular layers of reflective aluminum radiation shields, separated by low conductivity fiberglass spacer material.

7. The insulated casing assembly of claim 1, wherein said outer tubular section includes sealable means communicating with said annular space for enabling evacuation of said space of air and back-filling thereof with low conductivity gas.

8. The insulated casing assembly of claim 1, wherein said expandible sealing means for connecting said tubular sections comprises fluid-tight tubular bellows each connected at one of its end to the inner surface of one of said outer tubular sections and at its other end to the outer surface of one of said inner tubular sections.

9. The insulated casing assembly of claim 8, wherein said bellows are metal.

10. The insulated casing assembly of claim 9, wherein said bellows are welded at their ends to weld rings each welded to one of said tubular sections.

11. The insulated casing assembly of claim 1, wherein the ends of said outer tubular sections are externally threaded and said means for coupling said outer tubular sections comprises a thread coupling.

12. The insulated casing assembly of claim 11, wherein said thread coupling contains a fluorocarbon O-ring seal on its threads.

13. The insulated casing assembly of claim 1, wherein said inner and outer tubular sections and said tubular sleeve are steel.

14. The insulated casing assembly of claim 1, wherein said filler ring comprises an insulating material.

15. An insulated casing assembly comprising:
   (a) a pair of coaxially arranged casings, each casing comprising radially spaced steel inner and outer tubular sections defining an annular space therebetween filled with annular layers of reflective aluminum radiation shields separated by low conductivity fiberglass spacer material enveloped in a low conductivity gas, the ends of said outer tubular section being externally threaded and having a sealable filling point communicating with said annular space for enabling evacuation of said annular space of air and back-filling thereof with said low conductivity gas;

(b) metal fluid-tight tubular bellows at both ends of said casings, each said bellows welded at one of its ends to a first weld ring welded to the inner surface of one of said outer tubular sections, said bellows welded at its other end to a second weld ring welded to the outer surface of said inner tubular section at a location axially displaced from the end of said inner tubular section thereby forming an axially extending cavity around each said inner tubular section;

(c) a steel sleeve tightly fitting over the opposed ends of the inner tubular sections and extending into said axially extending cavities;

(d) a thermally insulative filler ring fitted on said sleeve and disposed between the opposed ends of said casings; and (e) a thread coupling for coupling said outer tubular sections, said thread coupling having a fluorocarbon O-ring seal on its threads.

16. The insulated casing assembly of claim 15, wherein said low conductivity gas is selected from the group consisting of carbon dioxide, krypton, xenon, hydrogen bromide, and combinations thereof.

17. An insulated well casing comprising radially spaced inner and outer tubular sections defining an annular space therebetween, said annular space being filled with multilayered insulation enveloped in a low conductivity gas, and a fluid-tight tubular bellows at each end of said casing, said bellows being sealed at one of its ends to the inner surface of said outer tubular section and extending axially to be sealed at its other end to the outer surface of said inner tubular section at a location axially displaced from the end of said inner tubular section thereby forming an axially extending cavity around each end of said inner tubular section.

18. The insulated casing of claim 17, wherein said multilayered insulation comprises annular layers of reflective aluminum radiation shields separated by low conductivity fiberglass spacer material.

19. The insulated casing of claim 17, wherein said low conductivity gas is selected from the group consisting of carbon dioxide, krypton, xenon, hydrogen bromide, and combinations thereof.

* * * * *